United States Patent

[11] 3,607,436

| [72] | Inventors | Richard J. Charles<br>Schenectady;<br>William J. Dondalski, Schenectady;<br>Stephan P. Mitoff, Elnora, all of N.Y. |
|---|---|---|
| [21] | Appl. No. | 885,698 |
| [22] | Filed | Dec. 17, 1969 |
| [45] | Patented | Sept. 21, 1971 |
| [73] | Assignee | General Electric Company |

[54] SINTERED BETA-ALUMINA BODIES AND METHOD
8 Claims, 2 Drawing Figs.

[52] U.S. Cl.................................................. 136/153, 106/65
[51] Int. Cl.........................................H01m 41/02
[50] Field of Search........................................... 136/153; 106/39, 58, 65; 252/518, 521

[56] References Cited
UNITED STATES PATENTS

| 3,298,842 | 1/1967 | Seufert......................... | 106/65 |
| 3,311,482 | 3/1967 | Klingler et al. ............... | 106/39 R |
| 3,432,314 | 3/1969 | Mazdiyasni et al. .......... | 106/39 R |
| 3,458,356 | 7/1969 | Kummer et al. .............. | 136/153 |
| 3,499,796 | 3/1970 | Hever et al. .................. | 136/153 |

Primary Examiner—Donald L. Walton
Attorneys—Richard R. Brainard, Paul A. Frank, Charles T. Watts, Frank L. Neuhauser, Oscar B. Waddell and Joseph B. Forman ABSTRACT: The electrical conductivity of a sintered sodium beta-alumina solid electrolyte can be increased substantially by incorporating small proportions of magnesia and yttria in the powder mixture used to produce the sintered body.

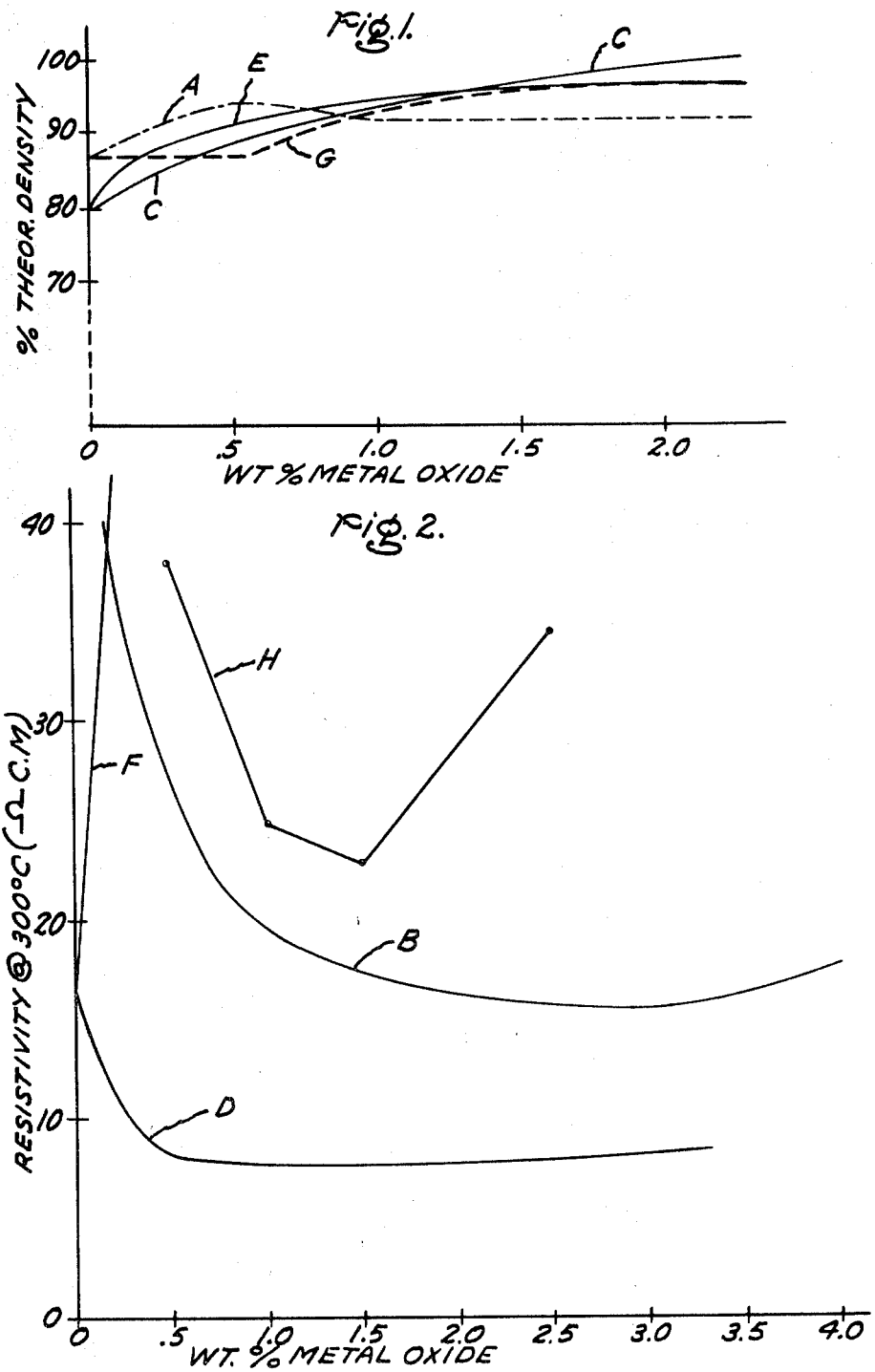

SINTERED BETA-ALUMINA BODIES AND METHOD

The present invention relates generally to electronic ceramics and is more particularly concerned with novel beta-alumina bodies having good electrical conductivity characteristics, and with a method of making these bodies.

Solid electrolytes afford the opportunity of constructing electrical energy storage devices in a variety of combinations of electrode materials useful over a broad range of operating temperature conditions. Thus, for example, a high-energy battery has been built in which the anode is sodium and the cathode is sulfur and both the sodium and sulfur are in the molten state at operating temperature and are in contact with and separated by an electrolyte of a thin, platelike body of sodium beta-alumina. The utility of such electrolytes depends upon their conductivity or, in other words, their value is limited to the extent that their internal resistance is relatively high. Consequently, in a sodium-sulfur cell having a normal operating temperature of 300° C., the resistivity of such an electrolyte should be less than 100 ohm-centimeters and preferably should be less than 10 ohm-cm. Prior efforts by those skilled in the art to produce consistently such low-resistivity beta-alumina bodies of reasonably thin wall section have led generally along the line of improving the density of these bodies in the belief that electrical conductivity and density are directly related. Substantial improvements in both density and conductivity have been accomplished as a result of these efforts involving higher compacting pressures and the use of certain additives in small amounts as sintering aids. It is known, for example, that density and electrical conductivity of alkali metal beta-alumina bodies in sintered condition are improved by incorporating one or another of several metal oxides such as MgO, $Li_2O$, NiO, ZnO, and CoO.

In our efforts to achieve substantial further improvement, particularly in the electrical conductivity of such bodies, we have discovered that the density of the final sintered body can be considerably increased without correspondingly increasing, and possibly even decreasing, the electrical conductivity of the body through the addition of materials designed to promote sintering. This inverse relationship is particularly marked in the case of CaO which in small amounts is an effective sintering aid for beta-alumina but virtually destroys the desirable electrical properties of beta-alumina sintered bodies. However, we have also discovered that electrical conductivity can be substantially increased without achieving nearly theoretical density through the use of certain additives. Still further, and more suprisingly, we have discovered that in terms of ultimate electrical conductivity, one can achieve a synergistic result through the use together of quite small proportions of certain metal oxide additives. Specifically, electrical conductivity superior to that which can be produced in any other way in beta-alumina bodies has been obtained through the use of a combination of magnesia and yttria. Moreover, while this result can be achieved to the full extent with small amounts of yttria, we have found that in amounts up to 5 percent yttria is fully effective in this respect. The amount of magnesia likewise may range up to 5 percent without significant loss of conductivity in the sintered beta-alumina bodies.

Our present invention in both article and method aspects is based upon the foregoing discoveries. Thus, a ceramic body of this invention, broadly described, consists essentially of sodium or potassium beta-alumina and from about 1 to about 5 percent magnesia and from about one-quarter to about 5 percent yttria. Preferably the sintered body contains about 2 percent magnesia and from about 1 to 3 percent yttria. Also, when the body is to be employed as a solid electrolyte, as in a sodium-sulfur battery, it will preferably be approximately 10 mils in thickness and impervious to the molten sodium and sulfur electrodes of the cell. Additionally, this ceramic body in sintered form will have a density of greater than 90 percent of the theoretical density of the material.

In its method aspect, this invention in general comprises the steps of preparing a substantially uniform powder mixture of sodium or potassium beta-alumina and a source of from 1 percent to 5 percent of magnesia and a source of one-quarter percent to 5 percent yttria. This mixture is subjected to compacting pressure to form a green body which is fired under an atmosphere containing free oxygen at a temperature between 1,600° C. and 1,900° C. until sintering is complete. Preferably, the powder mixture is admixed with a binder, suitably 10 percent polyvinyl alcohol in water, and the resulting moist material is extruded to produce a green body of the desired wall thickness and shape. Also, the resulting green body is preferably air-dried at room temperature and thereafter fired at 1,825° C. for 2 hours in a dry oxygen atmosphere.

In the drawings accompanying and forming a part of this specification:

FIG. 1 is a chart on which percent theoretical density after firing is plotted against weight percent of metal oxide for four different types of sodium beta-alumina compositions; and FIG. 2 is a chart on which resistivity at 300° C. (in ohm-centimeters) is plotted against weight percent metal oxide for beta-alumina compositions of FIG. 1.

In carrying out the process of this invention, one may use either potassium beta-alumina or sodium beta-alumina or a source thereof, mixing this material in finely divided form with the desired requisite amount of magnesia and yttria in similar particulate form. Preferably alpha-alumina and sodium meta-aluminate are used, as disclosed and claimed in copending application Ser. No. 885,960 filed of even date herewith in the names of Richard J. Charles, Stephan P. Mitoff and William G. Morris and entitled "Method of Making Sintered Beta-Alumina Bodies," and assigned to the assignee hereof. Additionally, as disclosed therein, it is preferable to employ a binder in preparing the batch mixture to be formed into green bodies and sintered to produce the solid electrolytes of this invention. Thus, polyvinyl alcohol in the form of an aqueous 10 percent solution and in proportion of about 65 volume percent of the powder mixture is specially suitable. Formation of green bodies of the wall thickness, size and shape of the desired final article may be accomplished through any of a variety of pressing operations and preferably by extrusion when the sintered product is to take the form of an open- or closed-ended tube or cylinder. Hydrostatic pressing is a specially suitable technique in some cases, depending upon the shape of the article to be produced, and die-pressing also has advantages in certain instances. The pressure employed will suitably be of the order of 25,000 p.s.i. in a die-pressing operation and 50,000 p.s.i. in a hydrostatic pressing operation involving the same powder mixture.

As soon as the green body is formed, the firing or sintering operation may be carried out, but preferably this step is delayed until the green body has been air-dried so that the sodium meta-aluminate sets up to impart the desired green strength. When sodium meta-aluminate is not employed or it is not necessary that the green body be capable of withstanding forces encountered in usual bulk-handling operations, the freshly formed green body may be fired immediately.

The firing operation in accordance with this invention is carried out at a temperature between 1,600° C. and 1,900° C. under an atmosphere containing free oxygen. This is a sintering step and it is preferably carried out as disclosed and claimed in a copending application Ser. No. 885,961 filed of even date herewith in the names of Richard J. Charles and Stephen P. Mitoff and William G. Morris, entitled "Method of Producing Beta-Alumina Electrolytes," and assigned to the assignee hereof. Thus, the atmosphere employed will preferably be dry oxygen of dew point below −80° F. and firing will continue until the green body has been fully sintered. A temperature of about 1,825° C. for a time of 2 hours are preferred conditions for this step of the process.

The following illustrative, but not limiting, examples of the practice of this invention are offered to further inform those skilled in the art of this invention in both its product and process aspects:

EXAMPLE I

Sodium beta-alumina of particle size approximately 1 micron was die-pressed at 12,500 p.s.i. to form a green body and then fired for 2 hours in dry oxygen (−80° F. dew point) at 1,800° C. The resulting sintered body in the form of a coupon 1 millimeter thick and 1 inch in diameter was 87 percent theoretical density and had resistivity at 300° C. of 600,000 ohm-centimeters.

EXAMPLE II

In an operation similar to that of example I, potassium beta-alumina of 1-micron particle size was hydrostatically pressed at 50,000 p.s.i. to form a green body in the form of a 1-inch diameter, 1 millimeter thick coupon. This coupon was fired at 1,825° C. for 2 hours in a dry oxygen atmosphere and upon cooling was tested for density and resistivity, which were 85 percent 3,200 ohm-centimeters at 300° C., respectively.

EXAMPLE III

A series of five samples in powder form were prepared from sodium beta-alumina as described in example I, except that these samples were die-pressed at 25,000 p.s.i. and before pressing magnesia in similar powder form was added to and blended with the second, third, fourth, and fifth samples in amounts of ½ percent, 1 percent, 2 percent, 3 percent and 4 percent respectively. The resulting green bodies then were fired for 2 hours in dry oxygen at 1,825° C. as described in example I. Upon test of the sintered bodies, density and resistivity data indicated at the respective points along curve A of FIG. 1 and curve B of FIG. 2 were obtained. Thus the resistivity of the control sample was of the order of that of the example I specimen, while the others all had resistivity values in the range from 16 to 27 ohm-centimeters.

EXAMPLE IV

A series of five samples in powder form were prepared from sodium beta-alumina as described in example I, each of these five samples being mixed with 2 percent of magnesia. Five-tenths percent of $Y_2O_3$ in similar powder form was added to and blended with the mixture of the second sample while 1 percent, 2 percent and 3 percent of the $Y_2O_3$ powder was mixed with the third, fourth and fifth samples of the series. These five samples were then individually die-pressed at 25,000 p.s.i. and fired in dry oxygen at 1,825° C., as described in the foregoing examples. Upon test of density and resistivity, data indicated at the respective points along curve C of FIG. 1 and curve D of FIG. 2 were obtained.

EXAMPLE V

In another operation like that described in example IV, sodium beta-alumina containing 2 percent magnesia was mixed with varying amounts of calcium oxide in a series of five samples. The particle size of the alumina, magnesia and lime were as described above, and the die-pressing to form the green body and the sintering operation were likewise as described in example IV for each of these five samples. The data obtained upon measuring the density and resistivity of the resulting sintered coupons are illustrated by Curve E of FIG. 1 and Curve F of FIG. 2 respectively.

EXAMPLE VI

The effectiveness of $Y_2O_3$ as an additive by itself both as to ultimate density and resistivity of the sintered body was determined by preparing as described in examples III, IV and V a series of four sodium beta-alumina mixtures containing, respectively, 0.5 percent, 1.0 percent, 1.6 percent, and 2.5 percent of yttria. The density and resistivity data obtained after preparing the green bodies and carrying out the sintering operation as described in example I are depicted by Curve G of FIG. 1 and Curve H of FIG. 2.

EXAMPLE VII

In still another operation representing the preferred practice of this invention, alpha-alumina was mixed together with sodium meta-aluminate and small amounts of magnesia and yttria, as follows:
Linde A alumina 78 percent
$Na_2 \cdot Al_2O_3 \cdot 3H_2O$ 19
MgO 2
$Y_2O_3$ 1 The binder was 64 volume percent of 10 percent polyvinyl alcohol in water. The resulting batch mixture was extruded to form a tubular body which, after drying in room temperature for 2 hours was fired at 1,825° C. for 2 hours in oxygen (dew point = −80° F.) The density of the sintered product approximated 100 percent and X-ray results established that the conversion to beta-alumina was complete. The resistivity of the body at 300° C. was found to be 8 ohm-centimeters.

Whenever proportions or percentages are stated in this specification and the appended claims, reference is made to the weight basis unless otherwise specified.

What we claim as new and desire to secure by Letters Patent of the United States is:

1. A ceramic body of density greater than 85 percent of theoretical density having electrical resistivity at 300° C., less than 100 ohm-centimeters and consequently having special utility as a solid electrolyte, said body consisting essentially of sodium beta-alumina or potassium beta-alumina and from about 1 percent to about 5 percent magnesia and from about 0.25 percent to about 5 percent yttria.

2. The ceramic body of claim 1 in which the amount of magnesia is about 2 percent.

3. The ceramic body of claim 1 in which the amount of magnesia is about 2 percent and the amount of yttria is from about 1 percent to about 3 percent.

4. The ceramic body of claim 1 in which the body is of substantially uniform thickness approximating 10 mils.

5. The ceramic body of claim 1 in which the body is approximately 1 millimeter thick.

6. The ceramic body of claim 1 in which the amount of magnesia is about 2 percent and the density of the body is greater than about 90 percent of theoretical density.

7. The method of making a ceramic body having density greater than 85 percent of theoretical density and electrical resistivity at 300° C., less than 100 ohm-centimeters and consequently having special utility as a solid electrolyte in a sodium-sulfur battery which includes the steps of preparing a substantially uniform powder mixture of sodium-beta alumina or potassium beta-alumina and a source of from 0.5 percent to 5.0 percent of magnesia and a source of from 0.25 percent to 5.0 percent yttria, subjecting the said powder mixture to compacting pressure and thereby forming a green body, and firing the green body under an atmosphere containing free oxygen at a temperature between 1,600° C. and 1,900° C. and thereby sintering the green body.

8. The method of claim 7 in which the powder mixture is mixed with a binder of 10 percent polyvinyl alcohol in water and in which the resulting mixture is extruded to produce the desired green body, and in which the resulting green body is air dried at room temperature and thereafter fired at 1,825° C. for 2 hours in a dry oxygen atmosphere.